United States Patent [19]

Sato et al.

[11] 4,285,837
[45] Aug. 25, 1981

[54] CATALYST FOR STEAM REFORMING OF HYDROCARBONS

[75] Inventors: Nobuhiro Sato, Nagoya; Yoshinobu Yamaguchi, Seto; Hitoshi Kodama, Nagoya; Isamu Koshdyama, Nagoya; Nanahiko Kitano, Nagoya; Shigeharu Tsutsumi, Inazawa, all of Japan

[73] Assignees: Fujimi Kenmazai Kogyo Co., Ltd., Nishikasugai; Toyo Engineering Corporation, Tokyo, both of Japan

[21] Appl. No.: 138,810

[22] Filed: Apr. 9, 1980

[30] Foreign Application Priority Data

Apr. 18, 1979 [JP] Japan .................................. 54-47471

[51] Int. Cl.$^3$ .......................... B01J 21/04; B01J 23/74
[52] U.S. Cl. ................................. 252/466 J; 423/654
[58] Field of Search .................. 252/466 J; 48/214 A; 423/654

[56] References Cited

U.S. PATENT DOCUMENTS

| | | | |
|---|---|---|---|
| 4,191,664 | 3/1980 | McArthur | 252/466 J |
| 4,216,123 | 8/1980 | Banks et al. | 423/654 |

*Primary Examiner*—W. J. Shine
*Attorney, Agent, or Firm*—Blanchard, Flynn, Thiel, Boutell & Tanis

[57] ABSTRACT

A catalyst for steam reforming of hydrocarbons comprises porous aluminum oxide and nickel oxide, characterized in that the porous aluminum oxide in which the pore volume given by the pores of the pore diameter ranging from 60 to 120 Å is not less than 0.35 ml./g. and the pore volume given by the pores of the pore diameter of more than 120 Å is not less than 0.1 ml./g. and the purity determined upon ignition dryness is not less than 98% by weight is impregnated with nickel in an amount ranging from 10 to 30% by weight, as converted to nickel oxide basis, based on the total amount by weight of the catalyst.

4 Claims, 4 Drawing Figures

CATALYST FOR STEAM REFORMING OF HYDROCARBONS

BACKGROUND OF THE INVENTION

1. Field of the Invention

This invention has an object to provide a catalyst that can be employed for reforming hydrocarbons with steam to produce a fuel gas consisting mainly of methane.

2. Description of Prior Arts

It has been previously known that a catalyst comprising a heat-resisting carrier of alumina, silica, etc., and a catalytically active component of nickel can be employed for reforming hydrocarbons with steam. However, a catalyst of that kind having activity at a low temperature is rather unstable, and therefore it results in a drawback that its activity is reduced when it is subjected to a temperature of higher than a certain level. The performance of a catalyst is greatly dependent upon its kind and nature. When a high performance catalyst is intended to be used for steam reforming of hydrocarbons, the hydrocarbons employed as the raw materials are practically restricted to those belonging to light hydrocarbons and the sulfur content of the hydrocarbon is set under severe requirements.

SUMMARY OF THE INVENTION

In the course of study for investigating the reasons for these behaviors, the present inventors noticed that the nickel catalysts generally employed for the steam reforming process greatly fluctuate in their activities depending upon the natures of the catalyst carriers. They further carried out precise comparative experiments on the catalytic activity using catalysts that comprise a variety of carriers, and found that a highly active catalyst having thermostability at an elevated temperature, and excellent durability, and giving a reduced degree of the carbon deposit can be produced by the use of a carrier that is a porous, highly pure aluminum oxide prepared by burning a boehmite gel and that has a pore volume and a pore distribution in a certain range.

The nickel that is an active component of the catalyst according to the invention can be incorporated into the catalyst, using a nickel-containing material that can be changed into nickel oxide upon thermal decomposition, such as nickel nitrate, nickel acetate, nickel oxalate or nickel formate. The nickel content of the catalyst is in a range of from 10 to 30% by weight (calculated in terms of nickel oxide) based on the total amount by weight of the catalyst.

The remaining portion is occupied with pure, active alumina serving as a carrier. The carrier can be produced by burning a boehmite gel and it contains not less than 98% by weight of aluminum oxide consisting mainly of γ-alumina. The carrier is a porous structural material having an apparent porosity in the range of from 50 to 70% and a surface area in the range of from 200 to 250 m$^2$/g., in which the pore volume provided by the pores of the pore diameter ranging from 60 to 120 Å is not less than 0.35 ml./g. and the pore volume provided by the pores of the pore diameter of more than 120 Å is not less than 0.1 ml./g.

An active alumina can be produced by burning an alumina trihydrate such as bialite or gibbsite. Since an active alumina produced from an alumina trihydrate, however, has no porous structure in the specific range, a catalyst comprising the active alumina as a carrier has no catalytic activity at a low temperature.

There is no specific limitation on the procedure for incorporating the nickel component into the porous, active alumina carrier, as far as the procedure is capable of placing the nickel or nickel oxide on the overall surface area of the porous structure as homogenously as possible. A conventionl procedure which comprises immersing the carrier in a solution of a nickel salt is appropriate.

An active alumina having the aforementioned nature and structural characteristics is, for instance, immersed in an aqueous solution of nickel nitrate. After the aqueous solution is immersed completely to reach the center of the porous structure, the alumina is dried at an ambient temperature and then forced to dry at about 120° C. The so treated alumina is further heated by holding it at a temperature ranging from 350° to 700° C., in air and for 3 hours, to give a catalyst of the invention.

In the above-stated procedure, the heat treatment preferably is in a range of from 400° to 500° C. By the heat treatment at lower than 350° C., the formation of nickel oxide proceeds relatively slowly or is incomplete. The heat treatment at higher than 700° C. produces a large amount of an inactive nickel compound such as a nickel aluminate spinel, due to combination of aluminum oxide and nickel oxide. It results in undesired difficulty in the reduction stage for producing a metallic nickel, which is the last stage in the preparation of the catalyst.

Nickel nitrate incorporated into the carrier by the immersion procedure is decomposed by the heat treatment to give nickel oxide. A catalyst of the invention preferably contains the so produced nickel oxide in an amount of from 10 to 30% by weight, preferably from 10 to 25% by weight, based on the total amount of the catalyst.

Figure 1:
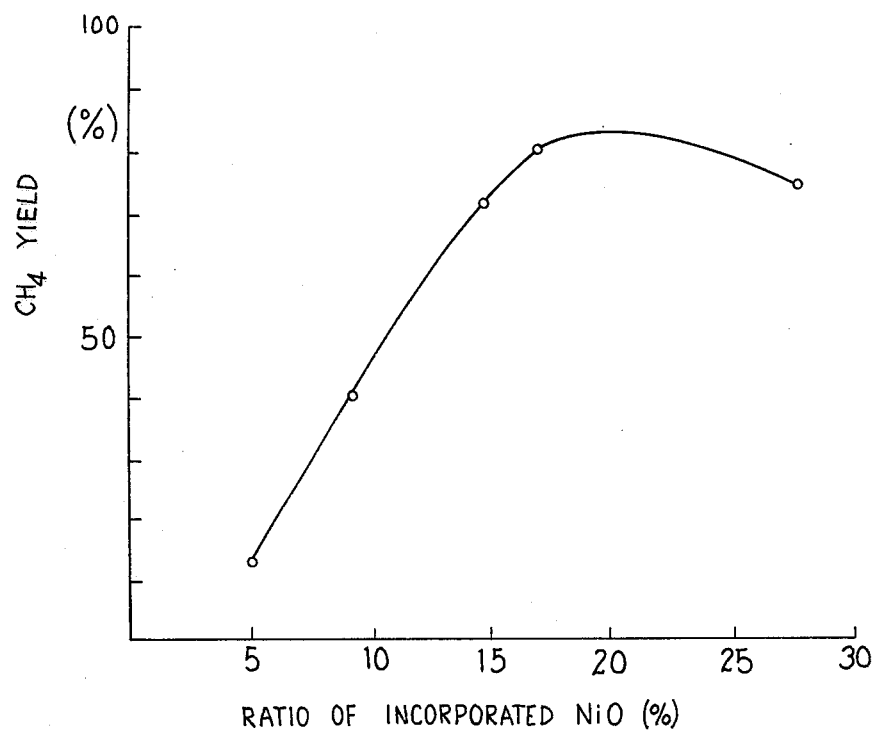
FIG. 1 shows the change of methane yield produced using the catalyst whose nickel oxide content is varied from 7.5 to 28.0% by weight and that had been treated by steam reforming at a reaction temperature of 400° C.

As seen from FIG. 1, the amount of methane contained in a produced gas abruptly decreases when a catalyst of the nickel content level of lower than 10% by weight (value calculated in terms of nickel oxide) is employed. On the other hand, the nickel content level of more than 30% by weight (value calculated in terms of nickel oxide) produces no substantial improving effect, that is, the curve showing the methane content slightly descends from the peak, as the nickel content level increases. This curve shows that the procedure employing the latter range is not advantageous for producing a high caloric value combustible gas by the steam reforming of hydrocarbons.

The highly pure aluminum oxide serving as a carrier in the catalyst of the invention has high thermostability, because the amount of impurities contained in the catalyst is reduced. The catalyst shows no prominent change in the activity when the reaction temperature increases or decreases at a rate of 100° C./Hr, as seen from FIG. 2. Moreover, the carbon deposit on the catalyst surface produced by the thermodecomposition of the raw material, that is, the feed hydrocarbon, is avoided because the nickel serving as an active component is placed homogeneously over the surface of the carrier having the pores of a limited pore diameter. Therefore, a process using the catalyst of the invention is free from not only the carbon deposit on the catalyst surface but also the blockade of the catalyst layer, which frequently occur and are regarded as the fatally detrimental disadvantages when a conventional highly active catalyst is employed. For this reason, there is no need of adding other components such as an alkali metal, an alkaline earth metal, a rare earth element, and etc., the such addition being applied to a conventional catalyst for the purpose of preventing the carbon deposit, when the catalyst of the invention is employed.

Figure 3:
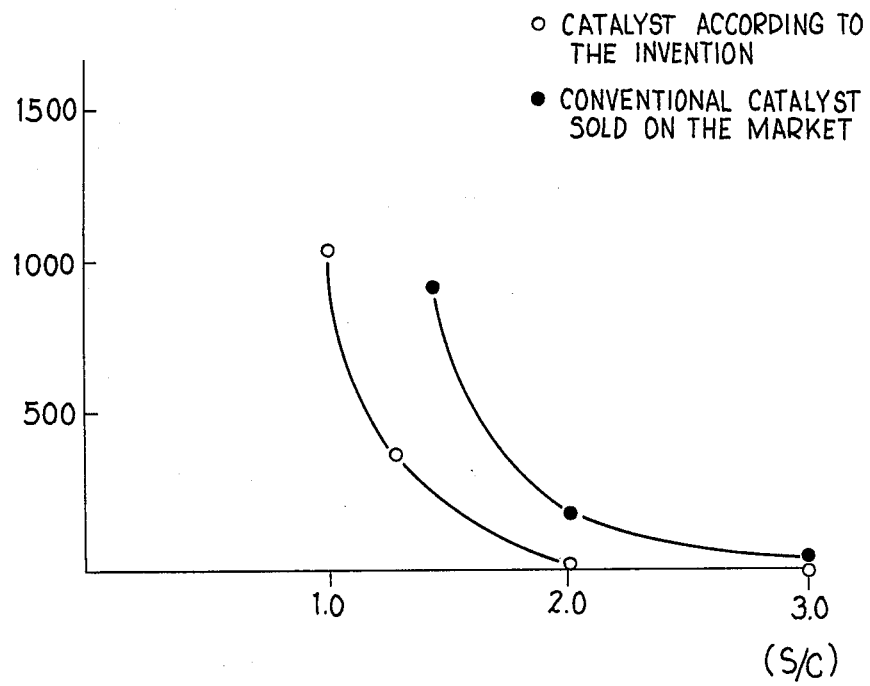
FIG. 3 shows the comparison of the production of carbon deposit between a catalyst according to the invention and a conventional catalyst sold on the market, both being subjected to a temp. of 400° C. at varying S/C (steam/carbon) values.

In addition to the above-stated advantageous features, the catalyst according to the invention has another valuable aspect, that is, the carbon deposit still remains at a low level, even if a steam mole number per 1 g. of the carbon contained in the hydrocarbon, the raw material, namely, a so-called steam—carbon ratio (hereinafter referred to as S/C) is set at a low level. This aspect is shown in FIG. 3.

The catalyst of the present invention will be illustrated with reference to the examples.

EXAMPLE 1

Catalyst A (an embodiment of the invention)

Catalyst A was prepared as follows.

An active alumina carrier of from 6 to 12 meshes, in which the pore volume given by the pores of the pore diameter ranging from 60 to 120 Å was 0.42 ml./g. and the pore volume given by the pores of the pore diameter of more than 120 Å was 0.13 ml./g. was immersed in 100 ml. of an aqueous solution containing 90 g. of nickel nitrate ($Ni(NO_3)_2.6H_2O$), and dried overnight at an ambient temperature. The carrier was further dried by heating at 120° C. for 6 hours, and then heated to 500° C. for 3 hours to burn.

The catalyst A thus obtained contained 13.9% by weight of nickel (value calculated in terms of nickel oxide).

Catalyst B (an embodiment of the invention)

This catalyst was prepared as follows.

An active alumina carrier of from 6 to 12 meshes, in which the pore volume given by the pores of the pore diameter ranging from 60 to 120 Å was 0.39 ml./g. and the pore volume given by the pores of the pore diameter of more than 120 Å was 0.11 ml.g. was immersed in 100 ml. of an aqueous solution containing 90 g. of nickel nitrate ($Ni(NO_3)_2.6H_2O$), and dried overnight at an ambient temperature. The carrier was further dried by heating at 120° C. for 6 hours, and then heated to 500° C. for 3 hours to burn.

The catalyst B thus obtained contained 20.6% by weight of nickel (value calculated in terms of nickel oxide).

Catalyst C (a reference catalyst)

This catalyst was prepared as follows.

An active alumina carrier of from 6 to 12 meshes, in which the pore volume given by the pores of the pore diameterranging from 60 to 120 Å was 0.3 ml./g. and the pore volume given by the pores of the pore diameter of more than 120 Å was 0.52 ml./g. was immersed in 100 ml. of an aqueous solution containing 90 g. of nickel nitrate ($Ni(NO_3)_2.6H_2O$), and dried overnight at an ambient temperature. The carrier was further dried by heating at 120° C. for 6 hours, and then heated to 500° C. for 3 hours to burn.

The catalyst C thus obtained contained 19.5% by weight of nickel (value calculated in terms of nickel oxide).

Catalyst D (a reference catalyst)

This catalyst was prepared as follows.

An active alumina carrier of from 6 to 12 meshes, in which the pore volume given by the pores of the pore diameter ranging from 60 to 120 Å was 0.37 ml./g. and the pore volume given by the pores of the pore diameter of more than 120 Å was 0.01 ml./g. was immersed in 100 ml. of an aqueous solution containing 90 g. of nickel nitrate ($Ni(NO_3)_2.6H_2O$), and dried overnight at an ambient temperature. The carrier was further dried by heating at 120° C. for 6 hours, and then heated to 500° C. for 3 hours to burn.

The catalyst D thus obtained contained 20.6% by weight of nickel (value calculated in terms of nickel oxide).

Catalyst E (a reference catalyst)

This catalyst was prepared as follows.

An active alumina carrier of from 6 to 12 meshes, in which the pore volume given by the pores of the pore diameter ranging from 60 to 120 Å was 0.06 ml./g. and the pore volume given by the pores of the pore diameter of more than 120 Å was 0.04 ml./g. was immersed in 100 ml. of an aqueous solution containing 90 g. of nickel nitrate ($Ni(NO_3)_2.6H_2O$), and dried overnight at an ambient temperature. The carrier was further dried by heating at 120° C. for 6 hours, and then heated to 500° C. for 3 hours to burn.

The catalyst E thus obtained contained 5.12% by weight of nickel (value calculated in terms of nickel oxide).

Into a reaction column of the inner diameter 25 mm was charged 10 ml. of the granular catalyst of from 6 to 12 meshes produced in the above-described procedure. The temperature of the catalyst layer was elevated to 500° C., and hydrogen was passed through the catalyst layer at 500° C., for 2 hours and in a flow rate of about 100 ml./min. to reduce and burn the catalyst, which was then subjected to the steam reforming experiment.

n-Hexane and steam were supplied into the inside of the reaction column to react under an atmospheric pressure and under the reaction conditions in which S/C was set at 2 and the period of contact between the gas and the catalyst layer was set at about 0.3 sec.

The reaction product was collected through a condenser and a gas meter and analyzed in a gas chromatographic column.

The results are set forth in Table 1.

TABLE 1

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| A | 590 | 95.3 | 60.7 | 9.7 | 15.0 | 11.5 |
| | 510 | 95.3 | 50.8 | 3.9 | 18.5 | 23.6 |
| | 453 | 85.5 | 44.3 | 1.7 | 19.4 | 30.6 |
| | 384 | 76.9 | 25.5 | 0.6 | 19.8 | 47.0 |

TABLE 1-continued

|  | 355 | 52.0 | 30.6 | 0.4 | 19.0 | 41.9 |

Rate* = Rate of Gasification
Catalyst A is an embodiment of the invention.

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| B | 541 | 92.3 | 57.9 | 5.7 | 18.0 | 18.0 |
|   | 488 | 93.2 | 50.1 | 2.7 | 19.9 | 27.2 |
|   | 443 | 92.8 | 38.7 | 1.3 | 20.7 | 35.7 |
|   | 394 | 92.1 | 28.8 | 0.4 | 20.8 | 45.8 |
|   | 349 | 69.3 | 24.8 | 0.2 | 20.2 | 51.9 |

Rate* = Rate of Gasification
Catalyst B is an embodiment of the invention.

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| C | 597 | 47.2 | 70.5 | 13.6 | 10.9 | 1.5 |
|   | 562 | 4.2  | 69.8 | 9.3  | 7.2  | 1.4 |

Rate* = Rate of Gasification
Catalyst C is a reference catalyst.

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| D | 590 | 84.0 | 63.9 | 8.9 | 15.6 | 10.9 |
|   | 505 | 93.6 | 42.1 | 3.9 | 19.0 | 25.2 |
|   | 429 | 77.4 | 26.2 | 1.1 | 20.5 | 34.3 |
|   | 380 | 53.5 | 23.5 | 0.4 | 20.2 | 34.6 |
|   | 340 | 42.6 | 17.5 | 0.3 | 19.8 | 38.2 |

Rate* = Rate of Gasification
Catalyst D is a reference catalyst.

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| E | 610 | 80.4 | 63.7 | 12.3 | 13.2 | 7.0 |
|   | 583 | 66.8 | 63.3 | 10.6 | 13.7 | 6.9 |
|   | 540 | 49.2 | 62.2 | 8.7  | 14.4 | 7.3 |
|   | 480 | 28.0 | 57.2 | 5.3  | 16.6 | 14.9 |
|   | 451 | 21.6 | 55.2 | 4.8  | 16.5 | 14.7 |

Rate* = Rate of Gasification
Catalyst E is a reference catalyst.

Each of the catalysts A and B has a porous structure according to the invention, that is, the pore volume given by the pores of the pore diameter ranging from 60 to 120 Å was not less than 0.35 ml./g. and the pore volume given by the pores of the pore diameter of more than 120 Å was not less than 0.1 ml./g. Both of the catalysts A and B brought about a value nearly equal to the value given in the equilibrium state and showed high activity, particularly in producing a greater amount of methane at a low temperature.

The reference catalyst C had a porous structure satisfying only one requirement according to the invention, that is, the pore volume given by the pores of the pore diameter ranging from 60 to 120 Å was less than 0.35 ml./g., even though the pore volume given by the pores of the pore diameter of more than 120 Å was not less than 0.1 ml./g. The catalyst C showed a low activity both at a high temperature or at a low temperature.

The reference catalyst D had a porous structure satisfying only one requirement according to the invention, that is, in this catalyst, the pore volume given by the pores of the pore diameter ranging from 60 to 120 Å was not less than 0.35 ml./g., but the pore volume given by the pores of the pore diameter of more than 120 Å was less than 0.1 ml./g. The catalyst D showed a low activity at a low temperature.

The reference catalyst E had a porous structure satisfying no requirement according to the invention, that is, the pore volume given by the pores of the pore diameter ranging from 60 to 120 Å was less than 0.35 ml./g. and the pore volume given by the pores of the pore diameter of more than 120 Å was less than 0.1 ml./g. The catalyst E showed a low activity either at a high temperature or at a low temperature.

Figure 4:
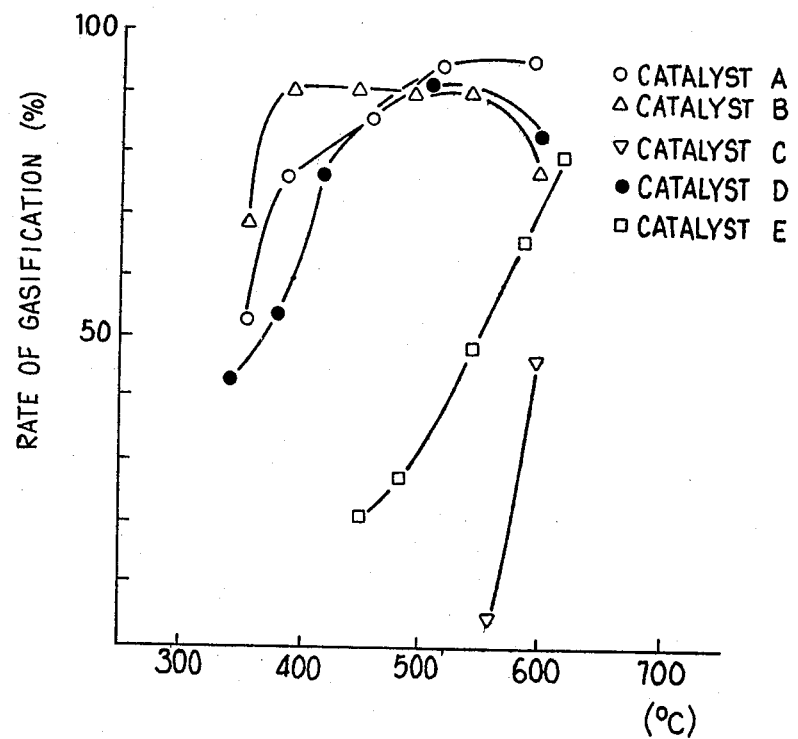
FIG. 4 shows the activity of the catalysts A through E, whose porous structures are different from each other, at a variety of temperatures.

The change of the activity of each of the catalysts A through E against the temperature is shown in FIG. 4.

EXAMPLE 2

Carriers suitable for the catalyst according to the invention were immersed in nickel nitrate ($Ni(NO_3)_2.6H_2O$) solutions of different concentrations, and dried overnight at an ambient temperature. The so treated carriers were further dried by heating at 120° C. for 6 hours, and then heated to 400° C. for 3 hours to burn. Thus, the catalysts F through J were prepared.

In Table 2, the concentration of nickel nitrate employed for immersing the carrier and the ratio of incorporation (value calculated in terms of nickel incorporated in the catalyst, % by weight) are shown in regard of each of the catalysts F through J.

TABLE 2

| Catalyst | Nickel nitrate in Nickel nitrate solution (g./100 ml.) | Ratio of Incorporation (% by weight) |
|---|---|---|
| F | 180 | 28.0 |
| G | 90  | 17.6 |
| H | 80  | 15.1 |
| I | 45  | 8.8  |
| J | 30  | 7.1  |

The steam reforming experiments were carried out on the catalysts F through J in the same manner as stated in Example 1, and the produced gases were analyzed. The results are set forth in Table 3, and the relationship between the ratio of incorporation of nickel oxide in the catalyst and the methane yield is shown in FIG. 1.

TABLE 3

| Catalyst | Reaction Temp. | Rate* | Produced Gas Distribution (vol. %) | | | |
|---|---|---|---|---|---|---|
| | | | $H_2$ | CO | $CO_2$ | $CH_4$ |
| F | 400 | 100.0 | 18.0 | 0.4 | 20.0 | 61.4 |
| G | 400 | 100.0 | 18.0 | 0.4 | 20.2 | 61.0 |
| H | 400 | 96.1  | 22.0 | 0.4 | 20.5 | 57.0 |
| I | 400 | 64.8  | 45.0 | 1.4 | 20.9 | 30.8 |
| J | 400 | 34.8  | 60.0 | 1.2 | 21.6 | 12.2 |

Rate* = Rate of Gasification

As seen from Table 2 and FIG. 1, the methane content in the produced gas decreases prominently, as the nickel oxide content decreases beyond the 10% by weight level. On the other hand, the methane content in the produced gas shows no substantial change, as the nickel oxide content increases beyond the 30% by weight level. The yield, on the contrary, decreases slightly in the course of the increase of the nickel oxide content.

EXAMPLE 3

Into a reaction column of the inner diameter 25 mm was charged 10 ml. of the catalyst A prepared as in Example 1. The catalyst was reduced at 500° C., for 2 hours and in a hydrogen gas stream of about 100 ml./min., and the so treated catalyst was subjected to the steam reforming experiment.

After the reduction procedure was complete, the temperature of the catalyst layer was decreased to 340° C., and the steam reforming experiment was carried out under the same reaction conditions as in Example 1. The analysis of the produced gas was carried out at the predetermined temperatures in the same manner as in Example 1, as the reaction temperature was slowly increased. The reaction was then continued at 700° C. over 6 hours, and the analysis of the produced gas was again carried out at the predetermined temperatures in the same manner as above, as the reaction temperature was decreased.

Figure 2:
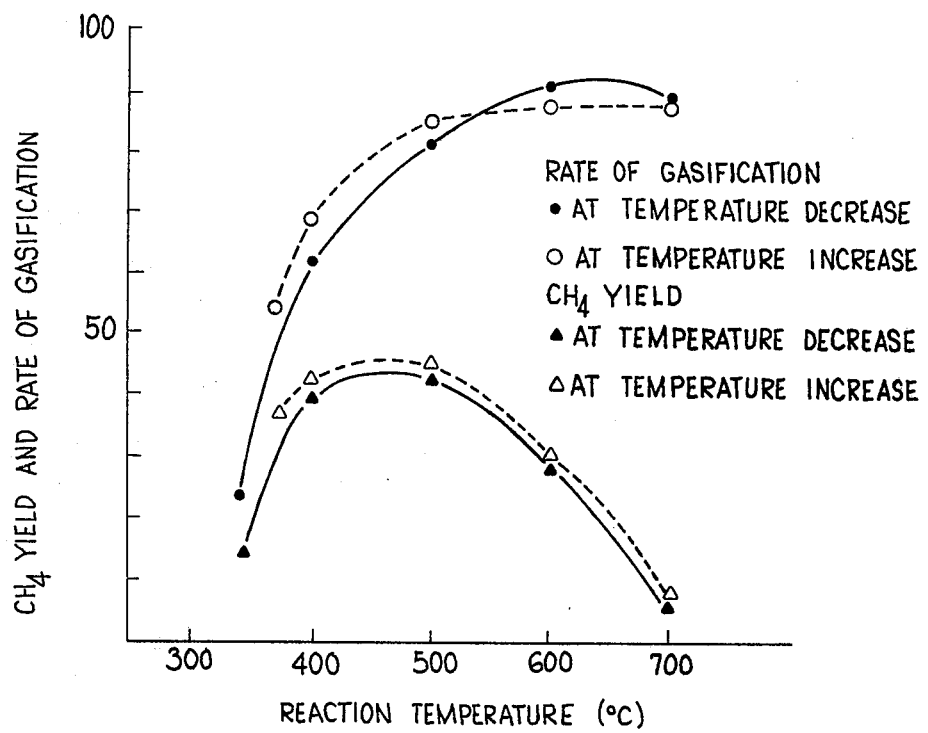
FIG. 2 shows the thermostability of the catalyst.

The results are set forth in Table 4, and the change in the catalytic activity is shown in FIG. 2.

There was observed no difference between the activity given in the course of the temperature increase and that given in the course of the temperature decrease. Therefore, the catalyst according to the invention was confirmed as having excellent thermostability at an elevated temperature.

TABLE 4

| Reaction Temp. | Rate* | Produced Gas Distribution (vol. %) | | | |
|---|---|---|---|---|---|
| | | $H_2$ | CO | $CO_2$ | $CH_4$ |
| 340 | 22.8 | 44.0 | 0.05 | 17.5 | 29.8 |
| 401 | 61.8 | 37.2 | 0.5 | 19.4 | 37.8 |
| 500 | 80.9 | 50.8 | 2.9 | 19.1 | 25.0 |
| 605 | 92.7 | 61.7 | 9.6 | 15.3 | 11.2 |
| 701 | 89.1 | 68.8 | 15.7 | 10.8 | 1.9 |
| 699 | 87.8 | 68.5 | 15.7 | 10.3 | 2.6 |
| 602 | 88.1 | 61.8 | 9.0 | 15.3 | 11.6 |
| 504 | 85.5 | 52.0 | 3.2 | 19.1 | 24.2 |
| 410 | 68.4 | 38.8 | 0.6 | 20.0 | 36.3 |

TABLE 4-continued

| Reaction Temp. | Rate* | Produced Gas Distribution (vol. %) | | | |
|---|---|---|---|---|---|
| | | $H_2$ | CO | $CO_2$ | $CH_4$ |
| 375 | 54.8 | 35.0 | 0.3 | 19.7 | 39.2 |

Rate* = Rate of Gasification

What is claimed is:

1. In a catalyst for the steam reforming of hydrocarbons comprising porous aluminum oxide as a porous carrier and a nickel component as an active catalyst component, the improvement which comprises: in said porous carrier (1) the pore volume provided by pores having pore diameters in the range of from 60 to 120 Angstrom units is not less than 0.35 ml/g, and (2) the pore volume provided by pores having pore diameters of more than 120 Angstrom units is not less than 0.1 ml/g, said carrier containing not less than 98% by weight of aluminum oxide and having said nickel component deposited thereon in an amount in the range of from 10 to 30% by weight, calculated as nickel oxide, based on the total weight of the catalyst.

2. A catalyst as claimed in claim 1, in which said porous aluminum oxide has an apparent porosity of 50 to 70% and a surface area of 200 to 250 $m^2/g$.

3. A catalyst as claimed in claim 1, in which the amount of said nickel component is from 10 to 25% by weight, calculated as nickel oxide, based on the total weight of the catalyst.

4. A catalyst as claimed in claim 1, in which said porous aluminum oxide has been prepared from a boehmite gel.

* * * * *